(12) United States Patent
Nie et al.

(10) Patent No.: US 9,648,805 B2
(45) Date of Patent: May 16, 2017

(54) LOCKING DEVICE, TELESCOPIC ROD AND MOWER COMPRISING THE LOCKING DEVICE

(71) Applicant: CHERVON INTELLECTUAL PROPERTY LIMITED, Road Town (VG)

(72) Inventors: Fangjie Nie, Nanjing (CN); Qian Liu, Nanjing (CN)

(73) Assignee: Chervon (HK) Limited, Wanchai (HK)

( * ) Notice: Subject to any disclaimer, the term of this patent is extended or adjusted under 35 U.S.C. 154(b) by 0 days.

(21) Appl. No.: 14/517,233

(22) Filed: Oct. 17, 2014

(65) Prior Publication Data
US 2015/0108728 A1    Apr. 23, 2015

(30) Foreign Application Priority Data

Oct. 23, 2013    (CN) .......................... 2013 1 0502603

(51) Int. Cl.
| | |
|---|---|
| *A01B 76/00* | (2006.01) |
| *A01D 34/00* | (2006.01) |
| *A01D 34/82* | (2006.01) |
| *F16B 7/14* | (2006.01) |
| *F16B 7/10* | (2006.01) |

(52) U.S. Cl.
CPC ......... *A01D 34/824* (2013.01); *F16B 7/1418* (2013.01); *F16B 7/105* (2013.01); *F16B 7/1454* (2013.01); *Y10T 403/32467* (2015.01); *Y10T 403/595* (2015.01)

(58) Field of Classification Search
None
See application file for complete search history.

(56) References Cited

U.S. PATENT DOCUMENTS

| | | | | |
|---|---|---|---|---|
| 4,492,170 | A * | 1/1985 | Solomon | A47B 9/08 108/146 |
| 6,101,678 | A * | 8/2000 | Malloy | B62B 5/06 16/430 |
| 6,347,777 | B1 * | 2/2002 | Webber | A47C 7/402 248/188.5 |

(Continued)

OTHER PUBLICATIONS

Canadian Intellectual Property Office, Office Action issued on Canadian patent application No. 2,868,272, dated Dec. 15, 2015, 4 pages.

*Primary Examiner* — Jacob Knutson
*Assistant Examiner* — Hilary L Johns
(74) *Attorney, Agent, or Firm* — Greenberg Traurig, LLP (57) ABSTRACT

A locking device includes an operating lever, a base and a repulsion generating member, wherein the operating lever has a releasing position and a locking position relative to the base, and the repulsion generating member is arranged between the base and the operating lever and generates a repulsion force for application to the operating lever during movement from the releasing position to the locking position. When the operating lever does not completely reach the locking position due to abnormal operation, the repulsion generating member will cause the operating lever to return to the releasing position thereby provide an indication. The locking device can thus provide an indication when the locking operation does not reach the correct position, thereby avoiding user confusion and abnormal operation.

4 Claims, 9 Drawing Sheets

(56) References Cited

U.S. PATENT DOCUMENTS

| | | | | |
|---|---|---|---|---|
| 6,401,866 B1* | 6/2002 | Roy | ............................ | E06C 7/44 |
| | | | | 182/204 |
| 7,624,998 B2* | 12/2009 | Barlow | ................. | A01D 43/063 |
| | | | | 280/47.371 |
| 2004/0208687 A1* | 10/2004 | Sicz | ............................ | B62J 1/08 |
| | | | | 403/109.3 |
| 2011/0042539 A1* | 2/2011 | Melic | ................... | E04G 21/3233 |
| | | | | 248/354.7 |

* cited by examiner

LOCKING DEVICE, TELESCOPIC ROD AND MOWER COMPRISING THE LOCKING DEVICE

RELATED APPLICATION INFORMATION

This application claims the benefit of CN 201310502603.7, filed on Oct. 23, 2013, the disclosure of which is incorporated herein by reference in its entirety.

FIELD OF THE DISCLOSURE

The present disclosure relates to the field of garden tools, and more particularly to a locking device, and a telescopic rod and a mower including the locking device.

BACKGROUND OF THE DISCLOSURE

For electric tools having a pushing rod or an operating rod, in order to reduce volume during transportation and storage, the pushing rod or the operating rod is generally designed as two or more retractable sections. Therefore, a locking mechanism is needed to lock the relative position between the two sections of the pushing rod when stretching the pushing rod. Current locking mechanisms are located between a locking position and a releasing position, and cannot completely reach the locking position when the two sections of the pushing rod are retracted to the desired position. At that moment, the fastening force for the relative position between the two sections of the pushing rod is relatively small, therefore the pushing rod may be retracted during operation, which can affect the normal operation of the user.

SUMMARY

The objective of the present disclosure is to provide a locking device, and a telescopic rod and a mower including the locking device, which can provide an indication when the locking operation of the user does not reach the correct position, and thereby avoiding user confusion and abnormal operation.

To obtain the above objective, the present disclosure provides a locking device, including an operating lever, a base and a repulsion generating member, wherein the operating lever has a releasing position and a locking position relative to the base, and the repulsion generating member is arranged between the base and the operating lever and generates a repulsion force for application to the operating lever during the movement of the operating lever from the releasing position to the locking position.

The present disclosure further provides a telescopic rod, including an inner tube, an outer tube and a locking device, wherein the inner tube is slidably connected to the outer tube, the locking device locking the relative position between the inner tube and the outer tube, wherein the locking device includes a pivoting shaft, an operating lever, a base and a repulsion generating member, the base being sleeved on the outer tube and the pivoting shaft being arranged on the base, one end of the operating lever being provided with a locking member for rotating around the pivoting shaft relative to the base, the repulsion generating member being arranged between the base and the operating lever and generating a repulsion force for applying to the operating lever during the movement of the operating lever from the releasing position to the locking position.

The present disclosure also provides a mower including a main body, four wheels supporting the main body and a pushing handle connected to the main body. The pushing handle includes a telescopic rod, wherein the telescopic rod includes an inner tube, an outer tube and a locking device, wherein the inner tube is slidably connected to the outer tube, the locking device locking the relative position between the inner tube and the outer tube, wherein the locking device comprises a pivoting shaft, an operating lever, a base and a repulsion generating member, the base being sleeved on the outer tube and the pivoting shaft being arranged on the base, one end of the operating lever being provided with a locking member for rotating around the pivoting shaft relative to the base, the repulsion generating member being arranged between the base and the operating lever and generating a repulsion force for applying to the operating lever during the movement of the operating lever from the releasing position to the locking position.

The beneficial effect of the described devices lies in that, owing to the repulsion generating member being arranged between the base and the operating lever, the repulsion force is applied to the operating lever during the movement from the releasing position to the locking position, therefore, when the operating lever does not completely reach the locking position due to abnormal operation, the operating lever will return to the releasing position because of the repulsion force, and thereby provide an indication to the user. The described devices can also prevent the relative sliding between the inner tube and the outer tube of the telescopic rod of the mower when the inner tube and the outer tube do not extend to the position during the operating process.

DETAILED DESCRIPTION OF PREFERRED EMBODIMENTS

Exemplary locking devices will now be described in detail with reference to the drawings and specific embodiments.

Figure 1:
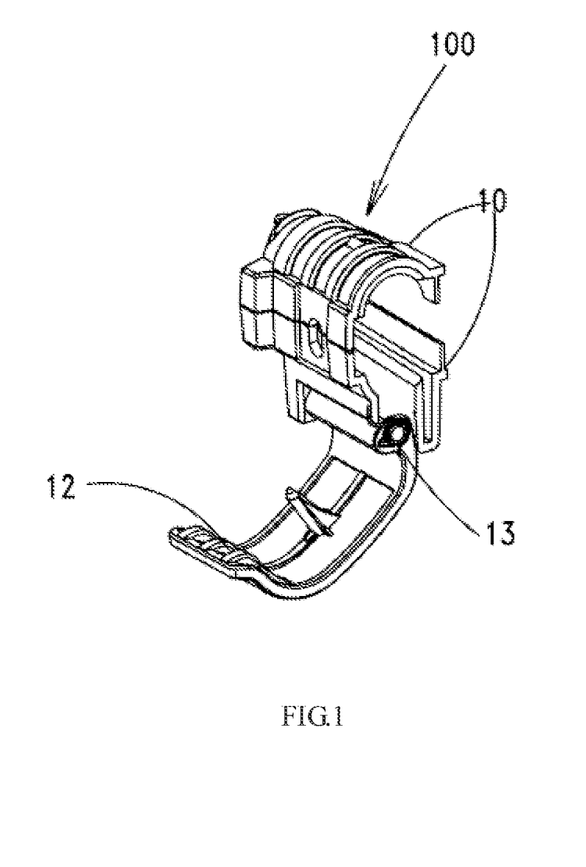
FIG. 1 is a schematic view of an exemplary locking device according to the description which follows.

As shown in FIG. 1, a locking device 100 includes a base 10, a pivoting shaft 11, an operating lever 12 and a repulsion generating member 13. The pivoting shaft 11 is arranged on the base 10, and one end of the operating lever 12 is provided with a locking member 12a for rotating around the pivoting shaft 11 relative to the base 10, and the repulsion generating member 13 is arranged between the base 10 and the operating lever 12.

In the illustrated device, the repulsion generating member 13 is a torsion spring with one end 13a connected to the base 10 and the other end 13b connected to the operating lever 12. When the operating lever 12 is in a releasing position, the torsion spring is in a natural condition, and when the operating lever 12 is in a locking position, the torsion spring is in a compressed condition. When the operating lever 12 is in the releasing position, a relatively small pretension force may be applied to the torsion spring.

Figure 2:
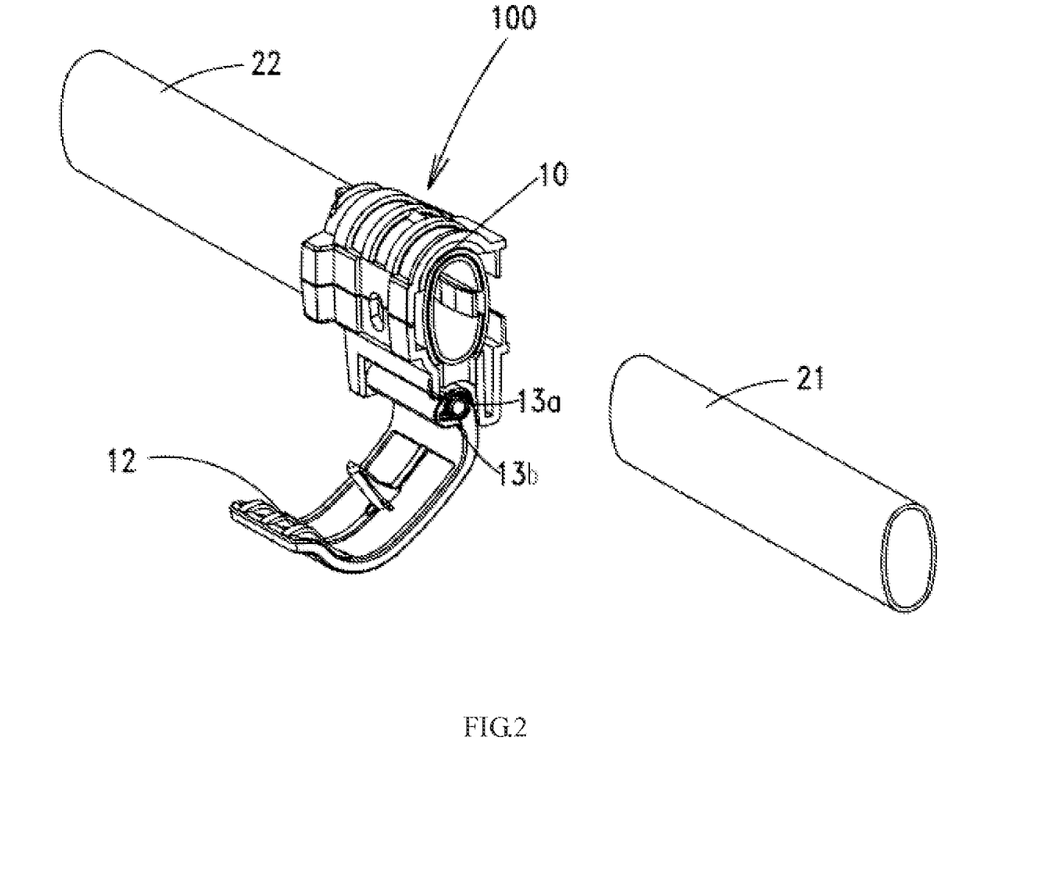
FIG. 2 is a schematic view of the locking device of FIG. 1 used in a telescopic rod.
Figure 3:
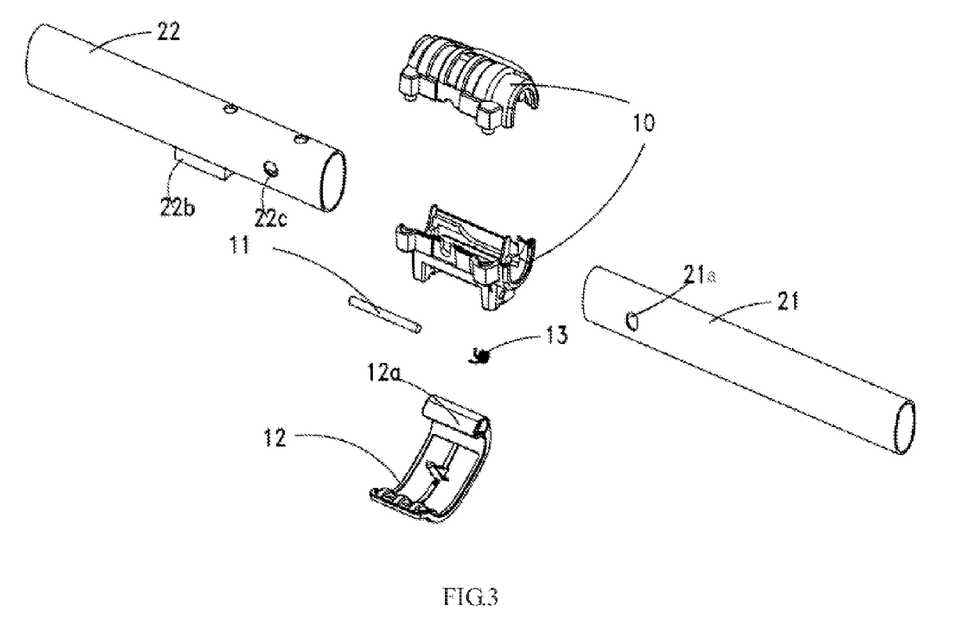
FIG. 3 is an exploded view of the telescopic rod of FIG. 2.
Figure 4:
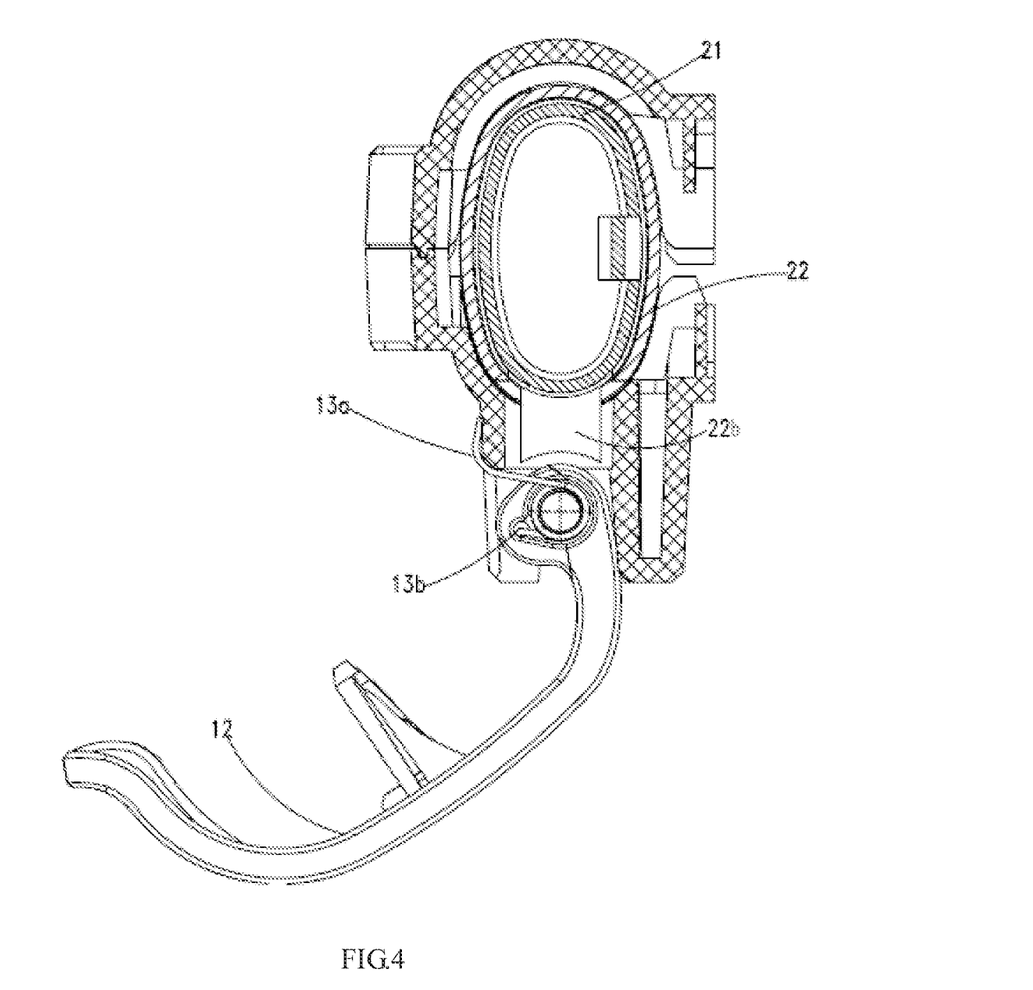
FIG. 4 is a sectional schematic view of the locking device of the telescopic rod of FIG. 2 in a releasing position.
Figure 5:
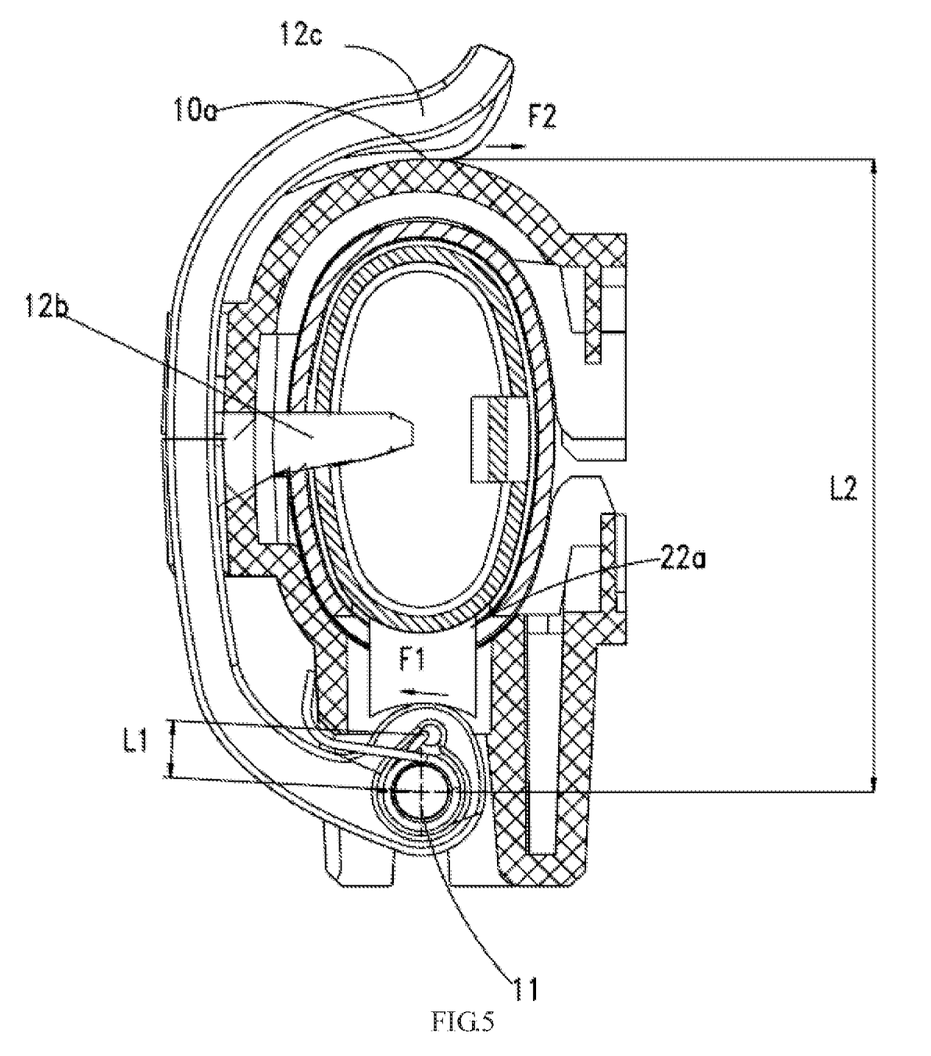
FIG. 5 is a sectional schematic view of the locking device of the telescopic rod of FIG. 2 in a locking position.
Figure 6:
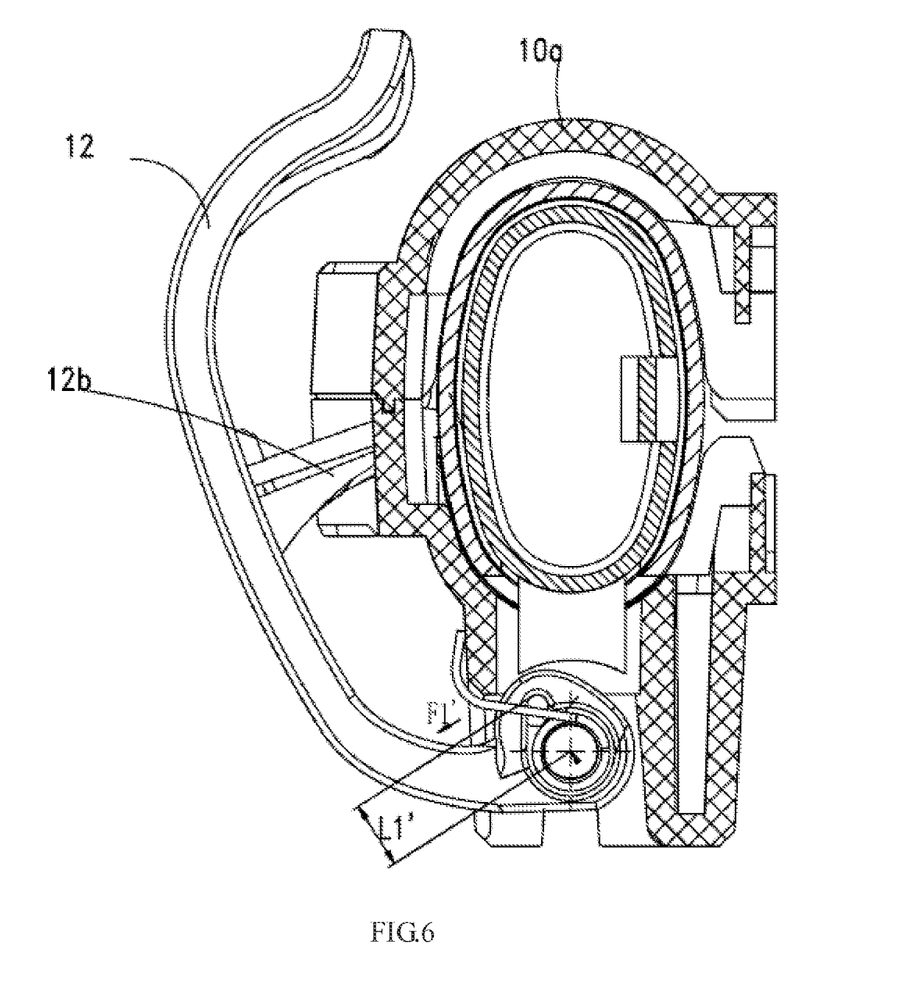
FIG. 6 is a sectional schematic view of the locking device of FIG. 2 between the releasing position and the locking position.

FIG. 2 is a schematic view of the locking device of FIG. 1 used in a telescopic rod. As shown in FIG. 2, a telescopic rod 20 includes an inner tube 21, an outer tube 22 and the locking device 100. The inner tube 21 is slidably connected to the outer tube 22, and the locking device 100 locks the relative position between the inner tube 21 and the outer tube 22. The base 10 of the locking device 100 is sleeved on the outer tube 21.

As shown in FIGS. 1-6, the outer tube 22 is provided with a through hole 22a and a compression member 22b which moves radially along the tube 22b. When the operating lever 12 is rotated to the locking position, the locking member 12a passes through the through hole 22a to compress the inner tube 21. The locking member 12a may also directly apply a force to the inner tube 21, and the compression member 22b is used to enable the locking member 12a to fix the inner tube more firmly.

Furthermore, the inner tube 21 has a hole 21a and the outer tube 22 has a hole 22c, and the operating lever 12 further includes a locking reinforcement member 12b which can be engaged with the hole 21a and the hole 22c simultaneously. In the illustrated example, the locking reinforcement member 12b is a post.

Additionally, the other end of the operating lever 12 opposite to the locking member 12a is provided with a friction portion 12c, and when the operating lever 12 is rotated to the locking position, the friction portion 12c is tightly engaged with the outer wall 10a of the base 10.

The illustrated, exemplary locking device may be operated as follows: when the locking device 100 is in the released state, the operating lever 12 is in the releasing position, and then the torsion spring is in a natural condition or maybe applying a relatively small pretension force. When the inner tube 12 and the outer tube 22 need to be locked, the operating lever is rotated towards the locking position by the user. At that moment, the operating lever 12 needs to overcome the torsion F1 of the torsion spring, and the arm of the force relative to the pivoting shaft 11 is L1, therefore the moment of torque is L1*F1. When the operating lever 12 is rotated to the locking position, the friction portion 12c is tightly engaged with the outer wall 10a of the base 10. The friction force of the friction portion 12c applied by the outer wall 10a is F2, and the arm of the force relative to the pivoting shaft 11 is L2, therefore the moment of torque is L2*F2. As long as L2*F2 is larger than L1*F1, the operating lever 12 will be maintained in the locking position.

When the user rotates the operating lever 12 from the releasing position towards the locking position, the operating lever will stay in a middle position between the releasing position and the locking position due to the abnormal operation of the user. For example, in this embodiment, since the relative position between the inner tube 21 and the outer tube 22 is not stretched to a preset position, the hole 21a is not aligned with the hole 22c, and the locking reinforcement member 12b can only be inserted into the hole 22c, as in the situation shown in FIG. 5. Because the locking device 100 in the illustrated example further includes the repulsion generating member 13, the operating lever 12 needs to overcome a torsion F1' of the torsion spring, and the arm of the force relative to the pivoting shaft 11 is L1', therefore the moment of torque is L1'*F1'. In that case, the operating lever will return to the releasing position under the action of the torsion F1', which provide an indication to the user that the operating lever 12 is not locked in position, thereby reminding the user to check whether the relative position between the inner tube 21 and the outer tube 22 are stretched in position.

In the illustrated example the repulsion generating member 13 is a torsion spring, but the present disclosure is not limited to this. In other embodiments, the repulsion generating member 13 may also be a tower-shaped spring 13' or two magnets 13"a and 13"b arranged opposite to each other, as shown in FIGS. 7 and 8 respectively.

Figure 7:
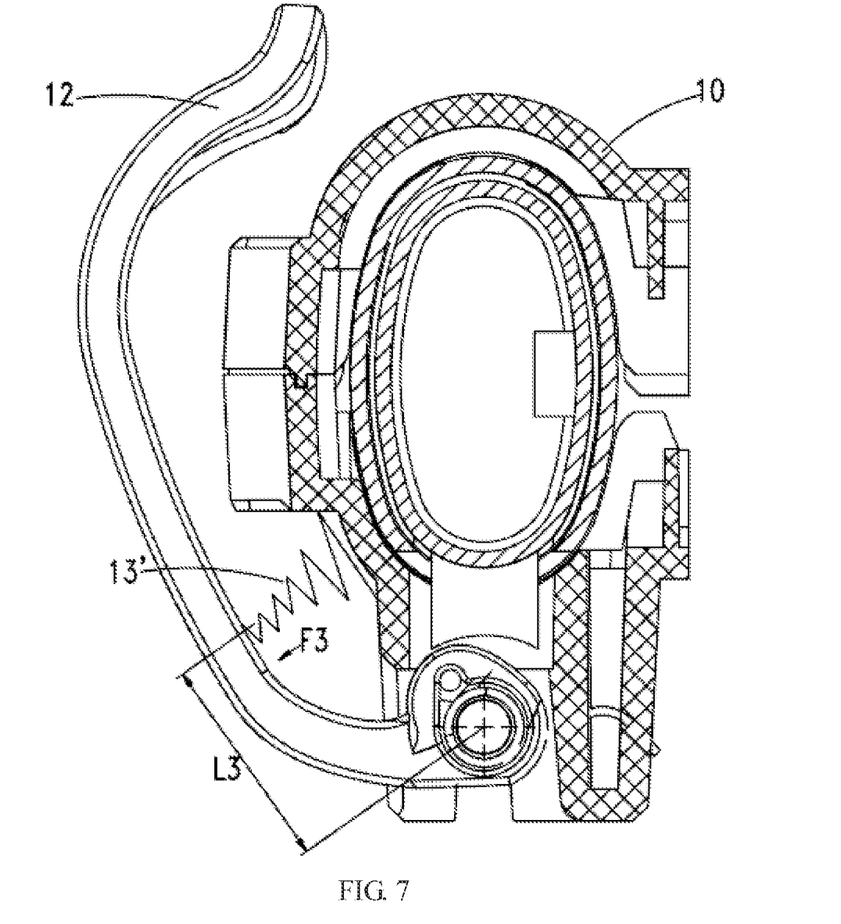
FIG. 7 is also a sectional schematic view of an exemplary locking device between the releasing position and the locking position according to the description which follows.

The example shown in FIG. 7 has similar structures and operating process to that shown in FIG. 1 and the difference only lies in that the repulsion generating member is a tower-shaped spring 13'. One end 13'a of the tower-shaped spring 13' is connected to the base 10 and the other end 13'b is connected to the operating lever 12. When the operating lever 12 is in the releasing position, the tower-shaped spring 13' is in a natural condition or applies a relatively small pretension force. When the operating lever 12 is in the locking position, the tower-shaped spring 13' is in a compressed condition. When the operating lever 12 is positioned between the releasing position and the locking position, the operating lever 12 will return to the releasing position under the action of the elastic force of the tower-shaped spring 13' so as to provide an indication to the user.

Figure 8:
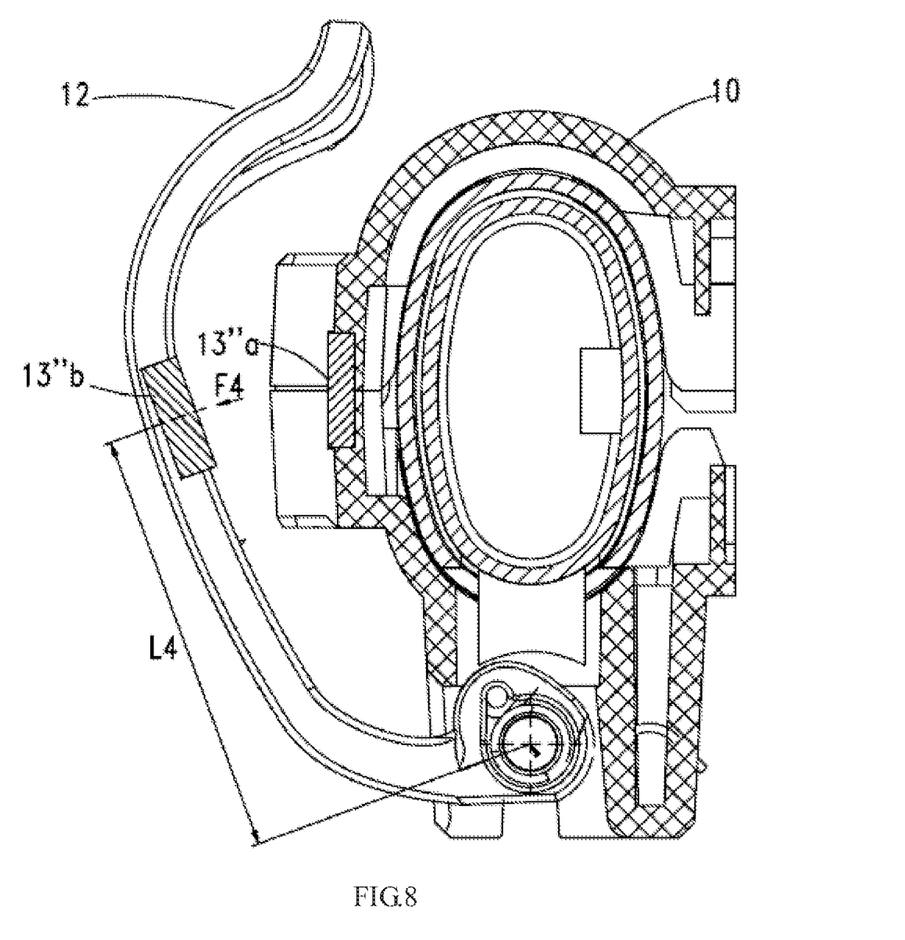
FIG. 8 is also a sectional schematic view of an exemplary locking device between the releasing position and the locking position according to the description which follows.

The example shown in FIG. 8 has similar structures and operating process to the example shown in FIG. 1 and the difference only lies in that the repulsion generating member includes two magnets 13"a and 13"b arranged opposite to each other. One magnet 13"a is arranged on the base 10 and the other magnet 13"b is arranged on the operating lever 12. The two ends of the two magnets 13"a and 13"b opposite to each other have the same polarity, for example, both are N pole. When the operating lever 12 is in the releasing position, the distance between the two magnets 13"a and 13"b is relatively large, therefore the repulsion force caused by the two magnets 13"a and 13"b is relatively small. When the operating lever 12 is in the locking position, the distance between the two magnets 13"a and 13"b is relatively small, therefore the repulsion force caused by the two magnets 13"a and 13"b is increased. When the operating lever 12 is positioned between the releasing position and the locking position, the operating lever 12 will return to the releasing position under the action of the repulsion force between the two magnets 13"a and 13"b so as to provide an indication to the user.

Additionally, in the above examples the operating lever has a rotating movement relative to the base, but the present disclosure is not limited to this. In other embodiments, the operating lever may also have a linear movement relative to the base, as long as the operating lever has a releasing position and a locking position relative to the base.

Figure 9:
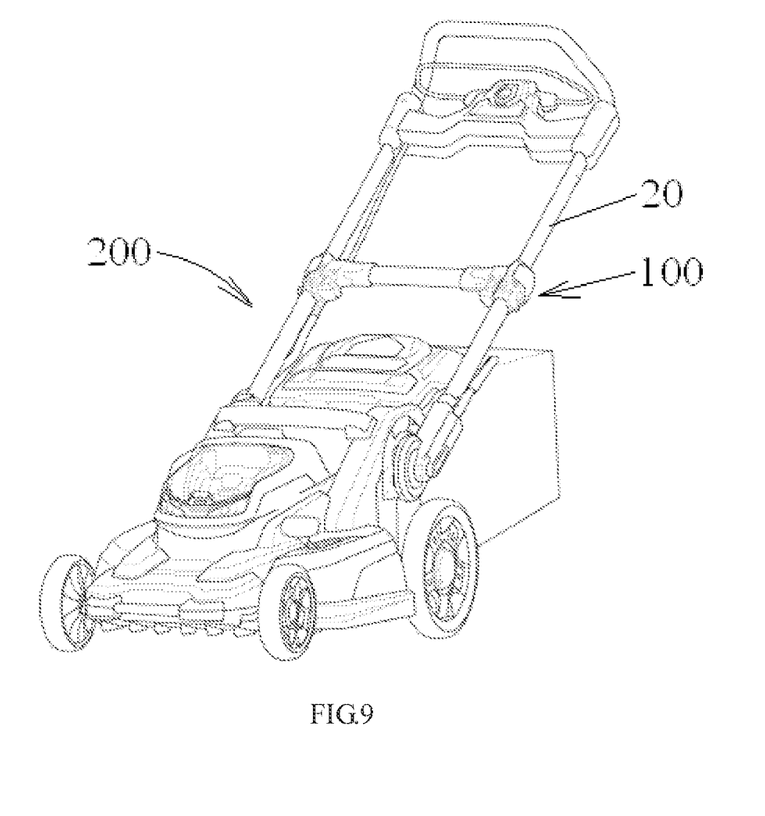
FIG. 9 is a schematic view of a mower including the telescopic rod of FIG. 2.

The present disclosure further provides a mower including the above telescopic rod. FIG. 9 is a schematic view of the telescopic rod used in the mower. The operating principle of the mower 200 will not be described in detail herein.

Certainly, the telescopic rod may also be used in other garden tools having a pushing rod (e.g. a handle) or an operating rod, such as a trimmer or a pole saw. A telescopic rod 20 of the mower may be locked by the locking device 100. Due to the abnormal operation of the user, the operating lever 12 will automatically return to the releasing position when it is positioned in a middle position between the releasing position and the locking position, thereby providing an indication to the user that the inner tube and the outer tube are not locked in position. As such, the exemplary devices can prevent the relative sliding between the inner tube and the outer tube when the inner tube and the outer tube are not in the locking position during the operating process, and thereby prevent the risk of damaging the user.

The present disclosure describes a repulsion generating member arranged between the base and the operating lever, therefore when the operating lever is positioned between the releasing position and the locking position due to abnormal operation, the operating lever will return to the releasing position because of the repulsion force, and thereby provide an indication to the user. As such, the exemplary devices can prevent the relative sliding between the inner tube and the outer tube of the telescopic rod when the inner tube and the outer tube do not extend to the position during the operating process, and thereby prevent the risk of damaging the user.

The above illustrates and describes basic principles, main features and advantages of the present disclosure. Those skilled in the art should appreciate that the above embodiments do not limit the present disclosure in any form. Technical solutions obtained by equivalent substitution or equivalent variations are intended to fall within the scope of the appended claims.

What is claimed is:

1. A mower, comprising:
   a main body;
   four wheels supporting the main body; and
   a handle connected to the main body, the handle comprising a telescopic rod, wherein the telescopic rod comprises:
      an inner tube;
      an outer tube; and
      a locking device, wherein the inner tube is slidably connected to the outer tube, the locking device locking the relative position between the inner tube and the outer tube, wherein the locking device comprises:
         a pivoting shaft;
         an operating lever;
         a base; and
         a repulsion generating member,
         the base being sleeved on the outer tube and the pivoting shaft being arranged on the base, a first end of the operating lever being provided with a locking member for rotating around the pivoting shaft relative to the base, the repulsion generating member being arranged between the base and the operating lever and generating a repulsion force for application to the operating lever during the movement of the operating lever from the releasing position to the locking position,
      wherein the inner tube has a first through hole and the outer tube has a cooperating second through hole, the operating lever further comprises a locking reinforcement member for engagement with the first through hole and the second through hole simultaneously when the first through hole and the second through hole are aligned and the locking member is moved towards the locking position, and
      wherein a second end of the operating lever opposite to the first end of the locking member is provided with a friction portion, and when the operating lever is rotated to the locking position the friction portion is frictionally engaged with the outer wall of the base.

2. The mower according to claim 1, wherein the repulsion generating member is a torsion spring with one end connected to the base and the other end connected to the operating lever, when the operating lever is in the releasing position, the torsion spring is in a natural state, and when the operating lever is in the locking position, the torsion spring is in a compressed state.

3. The mower according to claim 1, wherein the repulsion generating member is a tower-shaped spring with one end connected to the base and the other end connected to the operating lever, wherein when the operating lever is in the releasing position, the tower-shaped spring is in a natural state, and when the operating lever is in the locking position, the tower-shaped spring is in a compressed state.

4. The mower according to claim 1, wherein the repulsion generating member comprises two magnets arranged opposite to each other, one magnet is arranged on the base and the other magnet is arranged on the operating lever, and two ends of the two magnets opposite to each other have the same polarity.

* * * * *